United States Patent [19]

Matsumoto

[11] 4,202,220
[45] May 13, 1980

[54] SOLENOID ACTUATED CONTROL SYSTEM

[75] Inventor: Sigeru Matsumoto, Yokohama, Japan

[73] Assignee: Victor Company of Japan, Limited, Yokohama, Japan

[21] Appl. No.: 893,245

[22] Filed: Apr. 3, 1978

[30] Foreign Application Priority Data

Apr. 4, 1977 [JP] Japan .............................. 52/41958[U]

[51] Int. Cl.² .......................... G05G 9/02; G05G 1/02
[52] U.S. Cl. .............................. 74/471 R; 74/483 PB; 242/201
[58] Field of Search .................... 74/471 R, 483 PB; 242/201; 310/15

[56] References Cited

U.S. PATENT DOCUMENTS

| 2,550,314 | 4/1951 | Winckler .......................... 74/471 X |
| 3,098,399 | 7/1963 | Berthiaume ....................... 74/471 X |
| 3,526,152 | 9/1970 | Farrington et al. ................ 74/471 X |
| 4,026,496 | 5/1977 | Kaneda .......................... 74/483 PB X |

FOREIGN PATENT DOCUMENTS 2651147   9/1976   Fed. Rep. of Germany ........ 74/471 R

*Primary Examiner*—Allan D. Herrmann
*Attorney, Agent, or Firm*—Lowe, King, Price & Becker

[57] ABSTRACT

A solenoid actuated control system comprises a solenoid device having a plunger carrying a transverse actuator pin and means for angularly moving the plunger to one of a plurality of predetermined angular positions in which the actuator pin is in operative alignment with a corresponding one of a plurality of instruments.

2 Claims, 4 Drawing Figures

SOLENOID ACTUATED CONTROL SYSTEM

BACKGROUND OF THE INVENTION

The present invention relates to solenoid actuated control systems in which a plurality of instruments are selectively actuated by a single solenoid device, and more particularly to a solenoid actuated control system for a tape recorder.

In the usual cassette tape recorders, it is necessary upon timer record to shift a cassette tape recorder in its record mode and to actuate a pause mechanism in order to prevent a pinch roller from being kept in press contact with the corresponding capstan for a long time.

By so setting the cassette tape recorder, connecting of a source of electric energy to the cassette tape recorder at a time preset by the timer causes the pause mechanism to be released, putting the tape recorder on record mode. Subsequently, when the tape has been wound up to an end, an auto stop mechanism operates to cause the tape recorder to cease operation.

During one cycle of steps required for timer record, the step of releasing occurs twice, i.e., once upon releasing the pause mechanism and the other upon releasing the appropriate keys to stop the tape travelling when the tape has been wound up to an end.

The usual cassette tape recorders have a first group of keys including a record key, a play-back key, a rewind key and a fast forward key; a latch plate for latching the first group of keys to their retracted operative positions; and a release key which when depressed causes the latch plate to release the first group of keys. For timer record, the tape recorder is equipped with an electric circuit to detect when the reel comes to a stop. A solenoid device causes the latch plate to release the first group of keys when it is energized in response to the electric circuit. Also provided are a pause mechanism to give a pause upon record and a release mechanism to release the pause mechanism. For timer record, another solenoid is conventionally provided to release the pause mechanism when the tape recorder is connected to a source of electric energy at a time preset by a timer.

The problem with the previously described conventional cassette tape recorder is that two solenoid devices are needed for performing the two releasing steps which occur at two different instances, contributing to the complexity in construction and to an increase in manufacturing cost.

To cause a single solenoid device to perform the two releasing steps there can be provided an appropriate selector mechanism which engages a plunger of the solenoid device selectively with instruments to be actuated to perform the two releasing steps required during one cycle of timer record. The selector mechanisms, having been proposed for this purpose are, however, complicated in construction, tending to result in unstable operation.

SUMMARY OF THE INVENTION

The present invention is based on the recognition that a plunger of a solenoid device is not only longitudinally movable along an axis but also rotatable about the axis. An object of the invention is to provide a new and approved solenoid actuated control system comprising a plurality of instruments which by way of example may be lock levers or the like; a further object is to provide a new and improved solenoid device with a plunger, which device is simple and reliable in operation to permit selective operative connection between the plunger and the plurality of instruments.

Another object of the invention is to provide a solenoid actuated control system suitable for use in a cassette tape recorder.

DESCRIPTION OF THE PREFERRED EMBODIMENT

Figure 1:
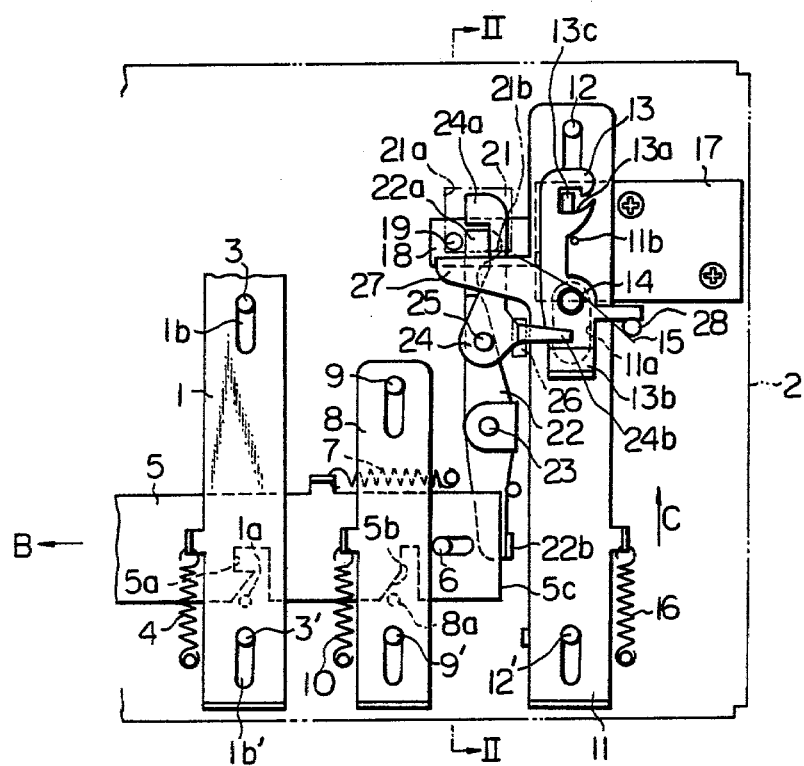
FIG. 1 is a fragmentary top plan view of a cassette tape recorder embodying the invention.
Figure 2:
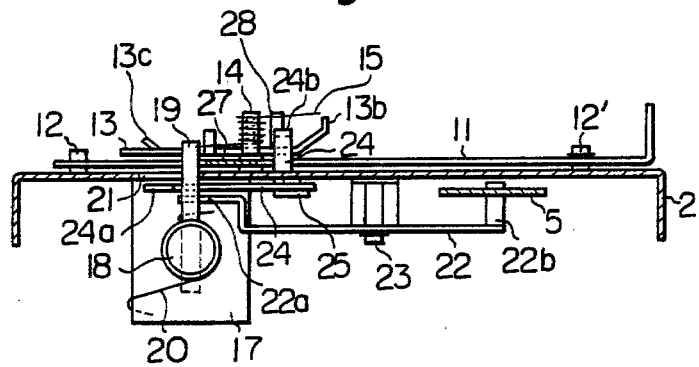
FIG. 2 is a section taken through the line II—II of FIG. 1.

Referring to the accompanying drawings, FIG. 1 is a partial top plan view of a cassette tape recorder in which a pause mechanism is in its inoperative condition; and FIG. 2 is a section taken through the line II—II of FIG. 1. A play-back key has two elongate slots $1b$ and $1b'$ slidably receiving two pins 3 and 3', respectively. Pins 3 and 3' are embedded in a chassis 2. The key is biased by spring 4 to take the illustrated released or projected position. A latch plate 5 engages pin 6, embedded on the back side of the chassis 2 so as to be limitedly slidable in a direction perpendicular to the direction in which the play-back key 1 is slidable. Pin 6 is biased by spring 7 to the right, as viewed in FIG. 1, to take the illustrated position. The latch plate 5 has a notch or cutout $5a$ corresponding to the key 1, which has embedded therein pin $1a$ adapted to engage in the notch $5a$.

Similarly to the play-back key 1, a record key, a rewind key and a fast forward key are slidably mounted on the chassis 2 and biased toward their projected positions by springs, respectively, although not shown. The record key, rewind and fast wind key can be depressed toward their operative positions, respectively, and are held in these positions by the latch plate 5 in the same manner as the play-back key 1 is held in its operative position by the latch plate 5.

A release key 8 engages two pins 9 and 9' embedded in the chassis 2 so as to be slidable normal to the direction in which the latch plate 5 is slidable. Key 8 is biased by a spring 10 to take the illustrated released or projected position. The release key 8 has embedded thereto a pin $8a$ cooperating with a cam surface $5b$ formed in the latch plate 5. Pressing the key 8 upward, viewing in FIG. 1, against the bias of the spring 10, causes the pin $8a$ to move the latch plate 5 in a direction shown by an arrow B toward a position in which the notch $5a$ releases the corresponding pin $1a$ so that the latch plate 5 releases the latched key or keys. The mechanism just described is known and conventional.

Designated by the reference numeral 11 is a pause key which engages two pins 12 and 12' embedded in the chassis 2 so as to be slidable in the same direction as the previously described keys 1 and 8 and which is biased by a spring 16 to take the illustrated released or projected position. The pause key 11 is formed with an elongated slot $11a$ through which a shaft 14, which is embedded in the chassis 2, extends. The shaft 14 is formed to have a shoulder and a reduced diameter portion projecting from the shoulder. A plate 13 is rotatably supported on the reduced diameter portion of the shaft 14. The lock plate 13 is held spaced from and over the pause key 11 because the shoulder of the shaft 14 prevents the lock plate 13 from contacting the pause key 11. The lock plate 13 is biased toward the pause key 11 by a spring 15 encircling the reduced diameter portion of the shaft 14. The spring 15 is compressed to bias the lock plate 13 toward the pause key 11, and arranged to bias the lock plate 13 in a clockwise direction, as viewed in FIG. 1. The clockwise rotation of the lock plate 13 is limited by a pin 28 projecting from the chassis and held in the illustrated position. The lock plate 13 is formed to have a notch 13a for receiving a pin 11b projecting from the pause key 11 to hold the pause key 11 in its operative position shown in FIG. 3; plate 13 also has an upwardly bending tongue 13c (see FIG. 4). In the position illustrated in FIG. 3, the pin 13b is in abutting engagement with the side edge of the tongue 13c. Release of the pause key 11 from the FIG. 3 position can be made by slightly depressing the pause key 11 in a direction designated by an arrow C from the FIG. 3 position and then releasing it. During this depressing movement the pin 11b disengages from the side edge of the tongue 13c to slip under the tongue 13c because the lock plate 13 can be rotatable clockwise, from the illustrated FIG. 3 position plate 13 is rotated until engaged by the pin 28; and during the subsequent releasing movement of the pause key 12, the pin 11b slides under the lock plate 13 to take the position illustrated in FIG. 1. Because the pin 11b slides under the lock plate 13 when leaving the notch 13a, the lock plate is rotatably lifted clockwise, as viewed in FIG. 4, against the bias of the spring 15. The mechanism just described is known and conventional.

Lifting of the end portion of the lock plate 13, which is formed with the notch 13a for the purpose of disengaging the notch 13a from the pin 11b (see FIG. 3), may be accomplished by urging opposite upwardly sloped end 13b of the lock plate 13 in a direction opposite to the direction shown by the arrow C.

A solenoid device 17 is attached to the back side of the chassis 2, as shown in FIG. 2. The solenoid device 17 comprises a plunger 18. When solenoid 17 is not energized plunger 18 is in the projected position, but, when the solenoid is energized, the plunger is retracted to the right, as viewed in FIG. 1, toward a retracted position. The plunger 18 is circular in section and rotatable. A transverse actuator pin 19 extends through the head portion of the plunger 18. As best shown in FIG. 2, a spring 20, mounted around the plunger 18 and having one end anchored to the fixed portion of the solenoid device 17 and an opposite end engaging the transverse pin 19, biases the plunger 18 in a direction toward its projected position and also clockwise, as viewed in FIG. 2. The transverse pin 19 has one end extending through an opening 21 formed in the chassis 2. The opening 21 has one side edge 21a which is engageable with the transverse pin 19 to define the projected position on the plunger 18 and another side edge 21b which is engageable with the transverse pin 19 to prevent further clockwise rotation of the plunger 18 under the bias of the spring 20 to define the illustrated position of the transverse pin 19.

A first instrument in the form of an automatic release lever 22, rotatably mounted on a shaft 23 embedded in the back of the chassis 2 has one end 22a disposed adjacent the transverse pin 19 and an opposite end formed with a finger 22b disposed adjacent and abuttingly engageable with the latch plate 5 at its right end 5c (as viewed in FIG. 1).

A second instrument in the form of lock plate release lever 24 urges the lock plate 13 toward the position in which the notch 13a is disengaged from the pin 11b. The release lever 24, rotatably mounted on a shaft 2, embedded in the back side of the chassis 2 has one end 24a positioned adjacent the transverse pin 19 to be engageable with the transverse pin 19 when the pause key 11 is depressed toward the position illustrated in FIG. 3. The lever 24 has an upright portion extending from the rear side to the front side of the chassis 2 through an opening 26 and a finger portion 24b leading from the upright portion. The finger portion 24b is engageable with the sloped end 13b of the lock plate 13.

In FIG. 1 is shown an inoperative condition of the tape recorder in which the transverse pin 19 is in operative alignment with or is opposite to the end 22a of the automatic release lever 22. However, in FIG. 1 pin 19 is out of operative alignment with the end 24a of the lock plate release lever 24.

Figure 3:
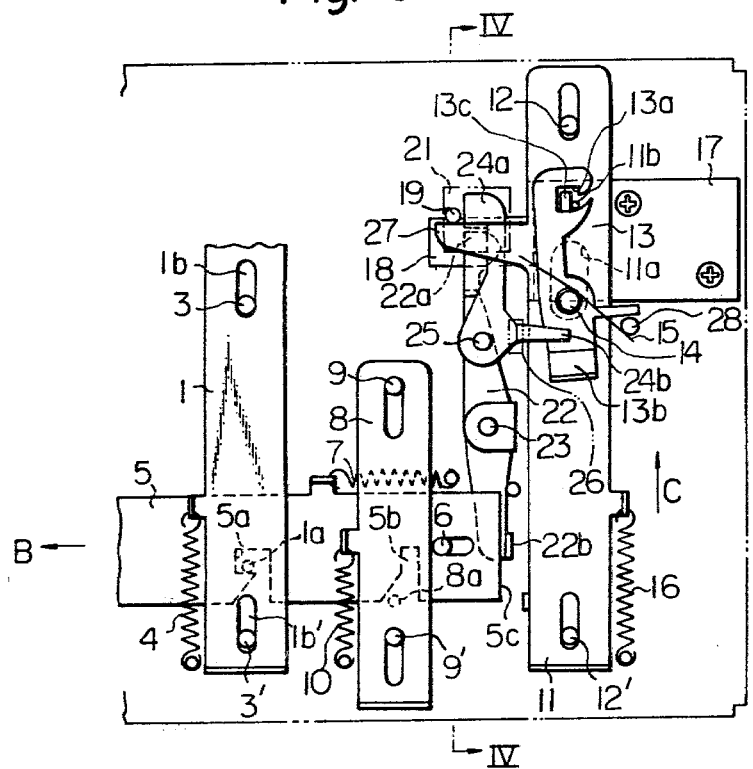
FIG. 3 is a similar view to FIG. 1 of another condition.
Figure 4:
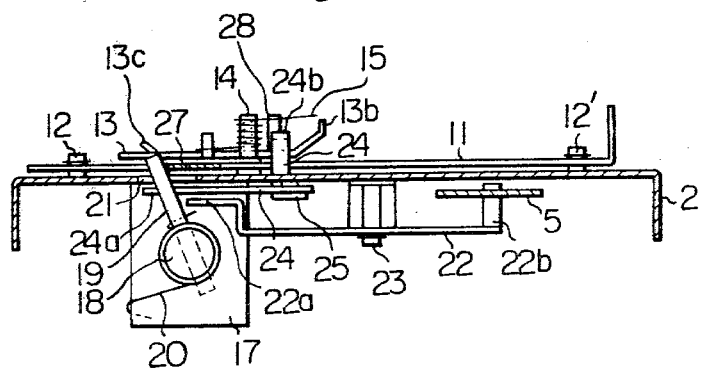
FIG. 4 is a section taken through the line IV—IV of FIG. 3.

In FIG. 3 is shown a pause condition in which the transverse pin 19 is out of operative alignment with the end 22a of the automatic release lever 22 but is in operative alignment with or opposite to the end 24a of the lock plate release lever 24. When, as shown in FIG. 3, the play-back key 1 is held in a depressed position, by means of the latch plate 5 and the pause key 11 is held in its depressed position by the lock plate 13, the pause key 11 engages a pinch roller arm (not shown) to cause a pinch roller (not shown) to disengage from a capstan (not shown) so that the tape stops running.

A selector arm 27 is formed integrally with the pause key 11, which is opposite to the transverse pin 19. Depressing the pause key 11 from the position shown in FIG. 1 toward the position shown in FIG. 3 causes the selector arm 27 to urge the transverse pin 19 from the position illustrated in FIG. 2, to the position illustrated in FIG. 4, angularly moving the plunger 18 counterclockwise.

The operation will be described as follows.

In order to set the tape recorder so that it starts to record at the time set by a timer, a record key (not shown) and the play-back key 1 are pressed until they are held in their operative or depressed positions thereof by the latch plate 5. The pause key 11 is also pressed to disengage the pinch roller from capstan. This movement of the pause key 11 causes the selector arm 27 to press or urge the transverse pin 19 to the left, as viewed in FIG. 2. Therefore plunger 18 is rotated from the angular position shown in FIG. 2, in which the pin 19 is opposite to the end 22a of the automatic release lever 22, toward the angular position shown in FIG. 4, in which the pin 19 is opposite to the end 24a of the lock plate release lever 24. Thus the tape recorder is set in a condition in which it is ready to release the pause mechanism. When, in this condition, a source of electricity is connected to the tape recorder, the solenoid device 17 is energized in response to an electric pulse from an electric circuit (not shown) to draw the plunger 18 from its projected position against the bias of the spring 20. This movement of the plunger 18 causes the transverse pin 19 to engage the end 24a of the release lever 24, thus rotating the release lever 24 clockwise. As the release lever 24 rotates clockwise, as viewed in FIG. 3, from the position shown in FIG. 3, the end 24b of the lock release lever 24 engages the sloped bended portion 13b to urge portion 13b in the direction opposite to the direction shown by the arrow C, thus lifting or rotating the slotted portion 13a clockwise as viewed in FIG. 2. Pin 11b, is thus released, permitting the pause key 11 to return to its position shown in FIG. 1. Upon return of the pause key 11 to the position illustrated in FIG. 1, the pinch roller comes into rolling contact with the capstan to let the tape travel, thus causing the tape recorder to start recording.

In the recording condition of the tape recorder, the plunger 18, under the bias of the spring 20, is returned to its projected position and the transverse pin 19 is rotated or moved to a position in which the transverse pin 19 is opposite to the end 22a of the automatic release lever 22. When the tape is wound up to an end and the reels come to a stop, a circuit detecting this condition permits electric current to pass through the solenoid device 17 to energize the same, thus drawing the plunger 18 from the projected position against the bias of the spring 20. This movement of the plunger 18 causes the transverse pin 19 to engage the end 22a of the automatic release lever 22 to urge the same, thus rotating automatic release lever 22 clockwise as viewed in FIG. 1. This clockwise rotation of the automatic release lever 22 causes the finger 22b at the opposite end of the automatic release lever to urge the latch plate 5 in the direction shown by the arrow B, thus releasing the keys latched by the latch plate 5.

Although, in the previously described embodiment, the invention is embodied in a timer recording device within a tape recorder, the application is not restricted to this embodiment but the invention may find many other applications.

Hence, according to the invention, a transverse actuator pin is mounted to a plunger of a solenoid device, which transverse pin is selectively and operatively connected with a plurality of operated instruments which may include, merely by way of example, a first instrument in the form of an automatic release lever and a second instrument in the form of a lock plate lever. The invention contributes to simplification in construction, cost reduction, and trouble free stable operation in contrast to the prior art complicated selector mechanism.

What is claimed is:

1. A solenoid actuated control system comprising:
   a plurality of instruments;
   a solenoid device having a plunger longitudinally movable along an axis between a projected position and a retracted position and which is rotatable about the axis;
   an actuator pin transversely extending with respect to said plunger and fixed thereto;
   urging means for biasing said plunger longitudinally toward the projected position and also applying a torque to said plunger to bias it to a predetermined angular position in which said actuator pin is in operative alignment with one of said plurality of instruments; and
   means for angularily moving said plunger, against the action of said urging means, toward another predetermined angular position in which said actuator pin is in operative alignment with another one of said plurality of instruments.

2. In a tape recorder;
   a first group of keys each being movable between a projected position and a retracted position and being biased toward the projected position;
   a latch plate being movable between a latching position and a releasing position and being biased toward the latching position, said latch plate latching any one of said first group of keys in its retracted position when said one key is pressed to take its retracted position;
   a second key movable between a projected position and a retracted position and being biased toward the projected position thereof;
   a mechanism for locking said second key in the retracted position thereof;
   a first instrument in the form of a release lever for said latch plate;
   a second instrument in the form of a lock release lever for said mechanism;
   a solenoid device having a plunger longitudinally movable along an axis between a projected position and a retracted position and which is rotatable about the axis;
   an actuator pin transversely extending with respect to said plunger and fixed thereto;
   urging means for biasing said plunger longitudinally toward the projected position thereof and also applying a torque to said plunger to bias it to a first predetermined angular position in which said actuator pin is in operative alignment with said first instrument; and
   a selector arm extending from said second key, said selector arm engageable with said actuator pin to angularily move said plunger, against the action of said urging means, toward a second predetermined position in which said actuator pin is out of operative alignment with said first instrument and in operative alignment with said second instrument in response to movement of said second key toward the retracted position thereof.

* * * * *